(12) United States Patent
Kariniemi

(10) Patent No.: US 12,391,080 B2
(45) Date of Patent: Aug. 19, 2025

(54) TRAILING ARM FOR A VEHICLE

(71) Applicant: Stephen Kariniemi, Phoenix, AZ (US)

(72) Inventor: Stephen Kariniemi, Phoenix, AZ (US)

( * ) Notice: Subject to any disclaimer, the term of this patent is extended or adjusted under 35 U.S.C. 154(b) by 0 days.

(21) Appl. No.: 18/885,626

(22) Filed: Sep. 14, 2024

(65) Prior Publication Data

US 2025/0091398 A1  Mar. 20, 2025

Related U.S. Application Data

(60) Provisional application No. 63/582,551, filed on Sep. 14, 2023.

(51) Int. Cl.
*B60G 7/00* (2006.01)
*B60G 7/02* (2006.01)

(52) U.S. Cl.
CPC ............ *B60G 7/001* (2013.01); *B60G 7/02* (2013.01); *B60G 2206/012* (2013.01); *B60G 2206/10* (2013.01); *B60G 2206/811* (2013.01)

(58) Field of Classification Search
CPC .... B60G 7/001; B60G 7/02; B60G 2206/012; B60G 2206/10; B60G 2206/811
See application file for complete search history.

(56) References Cited

U.S. PATENT DOCUMENTS

| | | | | |
|---|---|---|---|---|
| 2,712,742 | A * | 7/1955 | Neidhart | F16F 1/545 464/83 |
| 4,432,564 | A * | 2/1984 | Tronville | B60B 35/06 267/273 |
| 5,326,128 | A * | 7/1994 | Cromley, Jr. | B60G 3/145 301/128 |
| 5,409,255 | A * | 4/1995 | Alatalo | B60G 21/051 301/124.1 |
| 12,227,046 | B1 * | 2/2025 | VanDenberg | B60G 3/14 |
| 2019/0184822 | A1 * | 6/2019 | Vigen | B60K 17/08 |
| 2022/0185050 | A1 * | 6/2022 | Urabe | B60G 3/14 |
| 2022/0192095 | A1 * | 6/2022 | Barkey | A01D 34/66 |

* cited by examiner

*Primary Examiner* — Paul N Dickson
*Assistant Examiner* — Shams Dhanani
(74) *Attorney, Agent, or Firm* — Law Offices of Damon L. Boyd, PLLC

(57) ABSTRACT

An All-Terrain Vehicle with a frame, a rear axle and at least a rear trailing arm. The rear trailing arm may attach to the vehicle frame frontward of the rear axle and may enter a wheel hub space partially frontwards of the rear axle and attach to an inset wheel hub. The rear trailing arm may have multiple tubular portions including a frame tubular portion and a wheel tubular portion. The frame tubular portion and wheel tubular portion are attached together at approximately 90 degrees. The wheel tubular portion has at least a distal portion that is configured to encompass at least a partial length of an ATV axle and a proximal portion that is frontwards of ATV axle. The trailing arm provides clearance when the wheel hub is moved vertically by an angle of 27 degrees.

5 Claims, 7 Drawing Sheets

TRAILING ARM FOR A VEHICLE

The present application incorporates entire contents by reference, U.S. Pat. No. 9,493,191 to Kariniemi filed Apr. 10, 2014, entitled "Arcuate Frame For A Vehicle" and U.S. Pat. No. 10,023,234 to Kariniemi, filed Dec. 20, 2016, entitled "An Arcuate Frame For A Vehicle" and U.S. Pat. No. 10,899,184 to Kariniemi, filed Dec. 22, 2018, entitled "Trailing Arms For a Vehicle". The present application also incorporates and claims priority to U.S. provisional application No. 63/582,551 to Kariniemi filed Sep. 14, 2023.

FIELD OF THE INVENTION

The present invention generally relates to wheeled vehicles, and more specifically to all-terrain vehicles and utility vehicles.

BACKGROUND OF THE INVENTION

All-terrain vehicles (hereinafter "ATV") typically have a shorter wheelbase which gives the ATV increased maneuverability over longer wheelbased ATVs such as sandrails, desert trucks, and dune buggies. The shorter wheelbase however can have shortcomings compared to a longer wheelbase, for example, a shorter wheel base can have a rougher ride due in at least part to having shocks with less travel. In some cases, it remains advantageous to lengthen an axle to allow for more movement or travel. For example, if an axle can move 27 degrees in an up and down motion, a longer axle allows for more travel. In some cases, keeping width of the ATV at a specific dimension is advantageous. So, in order to increase travel, a longer axle is utilized by moving axle connection point (e.g. wheel hub), inset to a mating wheel, further to outside of the ATV. In order to provide proper clearance of trailing arms, it remains desirable to have improvements to the trailing arms. An example of an improvement to a trailing arm is a trailing arm made of tubular construction and having a cutaway portion and a remaining portion such that a trailing arm can be made that meets performance and cost objectives.

SUMMARY OF THE INVENTION

It has been recognized that it would be advantageous to develop an ATV with increased maneuverability and increased travel. In one embodiment, an ATV has a frame (e.g., an arcuate frame according to U.S. Pat. No. 9,493,191 to Kariniemi or U.S. Pat. No. 10,023,234 to Kariniemi, with trailing arms as described herein attached to the frame. The trailing arms have a first portion that may be substantially straight and a second portion that is angled (or at an angle) from the first portion and attached to an inset wheel hub. The trailing arms enter wheel hub space frontward (in some examples the trailing arms may enter rearward of the rear axle as the rear axle enters the wheel hub space) of a rear axle, as the rear axle enters the wheel hub space, and some portion of at least some of the trailing arms cross the rear axle (with in the wheel hub space) to rearward side (in some examples cross to the frontward side) of rear axle near attachment point to the wheel hub (while ensuring clearance between axle and trailing arm when wheel is moved vertically up to 27 degrees from original axle location). Trailing arms made and used in accordance with this disclosure, enable use of trailing arms for inset wheel hubs that attach to a frame portion frontward (in some examples may be rearward) of the rear axle and provide clearance when the wheel is raised or lowered up to 27 degrees. One advantage of a trailing arm built and assembled to an ATV as shown and described is scrub can be minimized. In other embodiments, advantages of an improved trailing arm may be using 2 tubes. Manufacturing simplicity is advantageous and can improve production costs. In one embodiment, one tube may be used to establish a longitudinal portion of the trailing arm or a substantial portion of a length of the trailing arm. A second tube may be used to establish a lateral portion, or substantially lateral portion of the trailing arm, and an overall width of the trailing arm. In various embodiments, different trailing arm dimensions are needed and tube length can be tailored to fit many different configurations of an ATV. In one embodiment, the tube attaches to a plate located within the wheel, extends around periphery of wheel hub or wheel hub attachment, for example 360 degrees around and extends inward towards first tube or portion of tube that would extend from an ATV frame, for example, up to a point where an ATV axle would start to impede travel. At that point, or before that point, the tube would have a cutaway zone so axle can move freely. The tubes can be made of different tube wall thickness to accommodate greater strength or lighter trailing arms. The length of the tube can be a different thickness than the width tube. The diameter of the tubes can vary as needed. An ease of assembly is a benefit.

A vehicle may comprise a frame; a first rear trailing arm; a rear wheel with a wheel hub space and a wheel hub, wherein the wheel hub is inset to the rear wheel inside of the wheel hub space, wherein the wheel hub has a wheel hub center axis; wherein the first rear trailing arm has a frame tube portion having a frame tube portion proximal end and a frame tube portion distal end wherein the frame tube portion distal end is configured to be attached to at least a portion of the frame frontward of the wheel hub center axis; wherein the first rear trailing arm has a wheel tube portion angled from the frame tube portion and the wheel tube portion having a wheel tube proximal portion and a wheel tube distal portion, wherein the wheel tube proximal portion is frontward of the wheel hub axis; and wherein the wheel tube distal portion is attached to the wheel hub and the wheel tube distal portion has a lumen that surrounds the wheel axis. The vehicle may have a wheel tube proximal portion as a remaining portion of the wheel tube distal portion that has been cutaway. The vehicle may have a frame tube proximal portion attached to the wheel tube proximal portion exterior surface. A trailing arm for a vehicle may comprise a frame tube portion and a wheel tube portion that is angled from frame tube portion; wherein the wheel tube portion has a wheel tube proximal portion and a wheel tube distal portion; wherein the wheel tube proximal portion has a circumference less than the wheel tube distal portion circumference; and wherein the wheel tube distal portion has a wall thickness defining a lumen. The trailing arm may have a wheel tube portion having a maximum length extending between the wheel tube distal portion end and the wheel tube proximal portion end and the wheel tube proximal portion extends along a majority of the wheel tube maximum length. A method of manufacturing a trailing arm obtain a tubular wheel portion for a trailing arm; obtain a tubular frame portion for a trailing arm; remove a portion of tubular wheel portion to define a tubular wheel distal portion and a tubular wheel proximal portion wherein the tubular wheel proximal portion is a remaining amount from the removed portion; and attach the tubular wheel portion distal portion and tubular frame portion together. A method comprising cutting tubular wheel portion to length and tubular frame portion to length. Additional features and advantages of the invention will be apparent from the description which follows, taken in conjunction with accompanying drawings, which together illustrate, by way of example, features of the invention.

DETAILED DESCRIPTION

Figure 1:
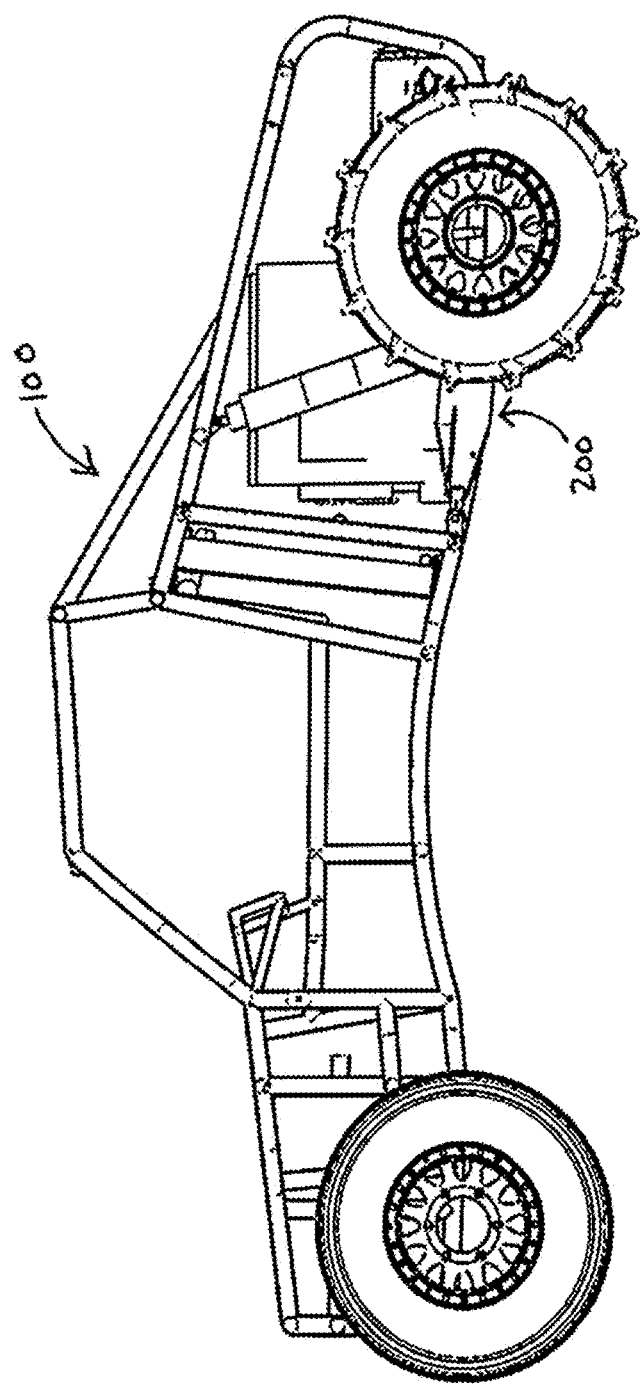
FIG. 1 shows a side view of a vehicle with trailing arm in accordance with an embodiment.

Reference will now be made to some embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A vehicle with trailing arms in accordance with various embodiments are disclosed herein and examples are illustrated in the Figures. The trailing arms may have a tubular (tubular is not to be read as only circular, for example, it could have a rectangular shape) construction and can be cut to length depending on a particular application. For example, the trailing arms may be constructed from a structural component or member, e.g., a tube made out of a tubular-shaped steel alloy. The trailing arms may be individual pieces, for example 2 individual pieces. In some embodiments, some of the individual pieces may be connected to each other by a welding. The structural component (e.g., tubular trailing arm) may have a tubular construction typically ranging from approximately 1 inch to 8 inches in diameter or whatever diameter is required for adequate strength. The trailing arms can be shaped to accommodate more wheel travel. For example in the wheel tube, a cutout may be made to accommodate an axle. The trailing arms may be attached at the frame, for example by a plate or a tubular bung tube to the frame on one end and attached to a wheel hub at opposing end. The trailing arms may have an arcuate shape or bend or change in direction to help accommodate more wheel travel.

Figure 2:
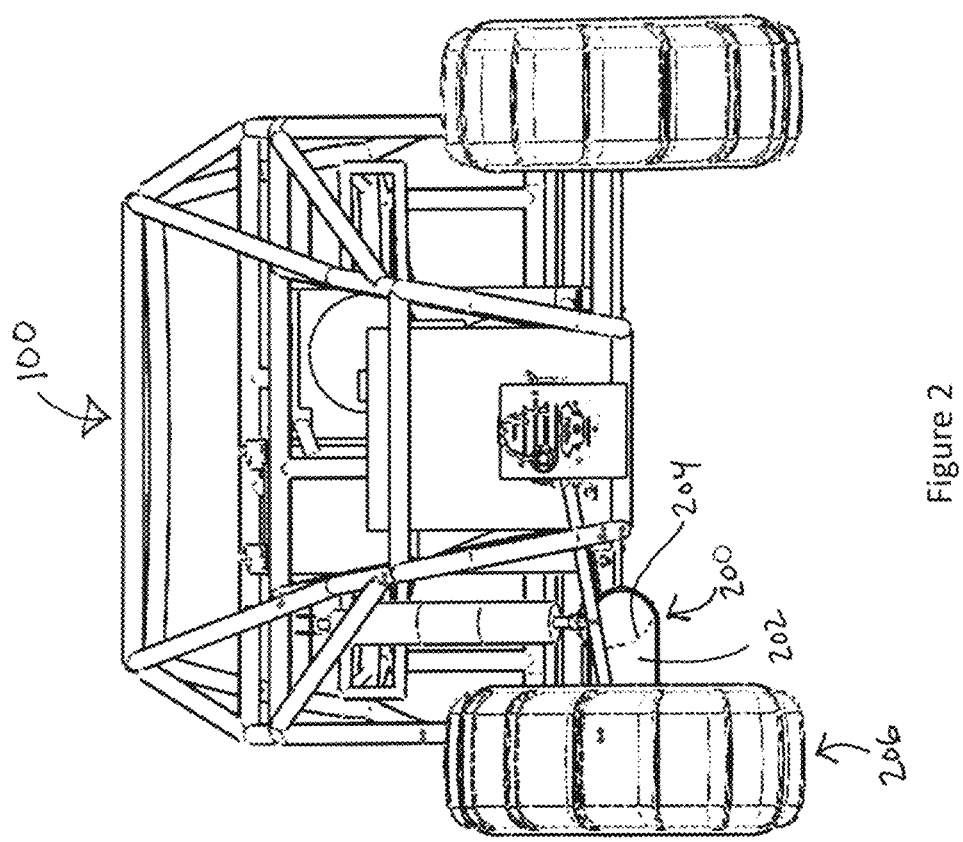
FIG. 2 is a rear view of a vehicle frame with a trailing arm in accordance with an embodiment.

In an embodiment, as shown in FIG. 1, an ATV 100 with a trailing arm 200 in accordance with an embodiment. FIG. 2 shows a rear view of a trailing arm 200 in accordance with an embodiment. A wheel tube 202 is partially inset inside a wheel 206 and is attached to a frame tube 204 and the frame tube 204 is attached to the ATV 100. FIG. 2 shows only one trailing arm 200, yet it is to be understood that a second trailing arm is intended to be used on ATV 100.

Figure 3:
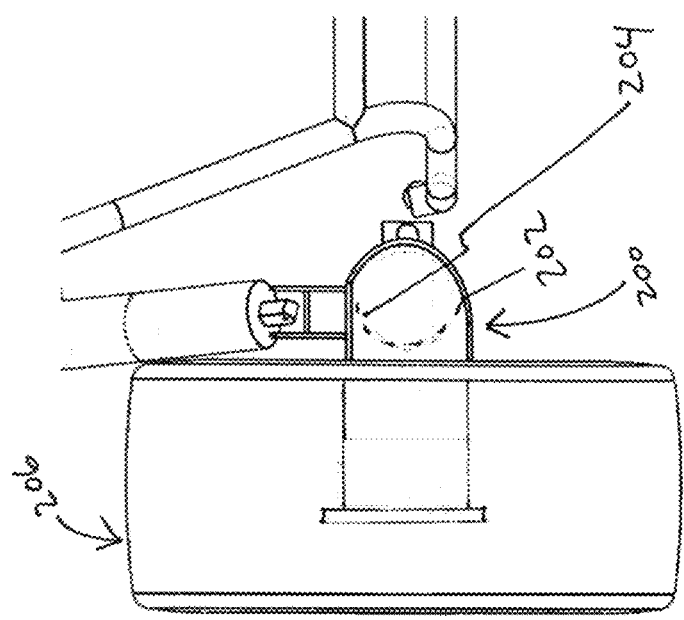
FIG. 3 is a partial rear view of a frame with a trailing arm in accordance with an embodiment.

In one embodiment, as shown in FIG. 3, the wheel tube 202 of the trailing arm 200 is inset inside a wheel 206 approximately 8 inches. The wheel tube 202 can be inset any dimension desired to accommodate specific needs of the vehicle. The wheel tube 202 can be attached to a plate that is attached inside of the wheel 206. The frame tube 204 is attached to the wheel tube 202. The wheel tube 202 is angled from the frame tube, for example approximately 90 degrees, outward towards the wheel 206.

Figure 4:
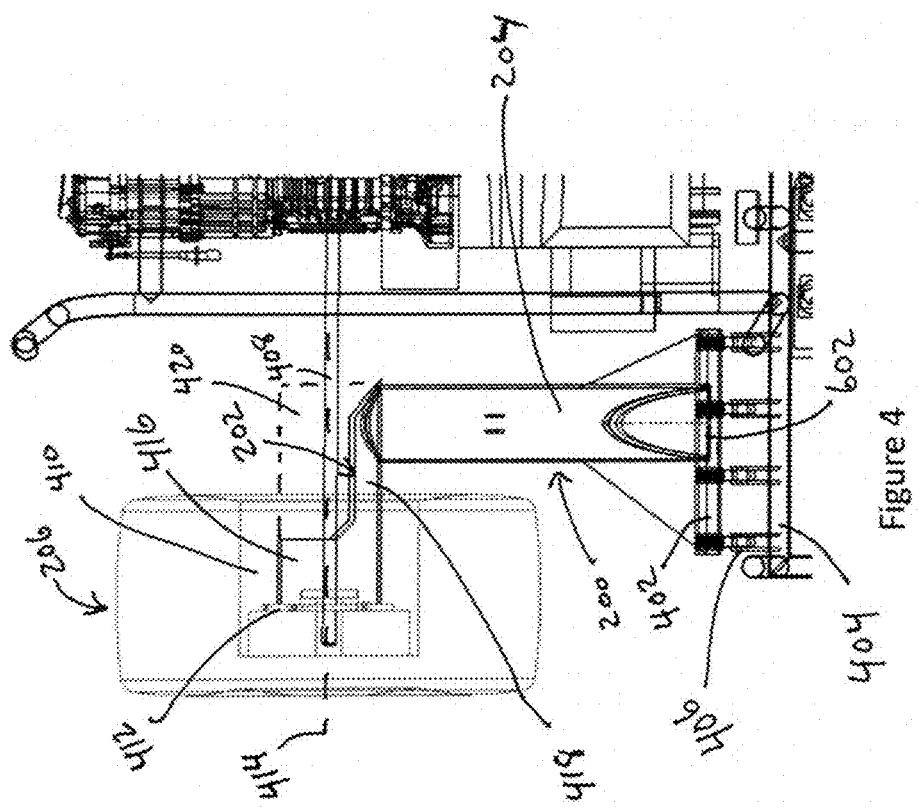
FIG. 4 is a partial top view of a vehicle frame with a trailing arm in accordance with an embodiment.

As shown in FIG. 4, by example, a frame tube 204 is attached to a wheel tube 202 of trailing arm 200. The frame tube 204 is attached to a mating mechanism 402, e.g., a plate or bung tube. The mating mechanism 402 may be a bung tube and the bung tube 402 may be wider than the frame tube 204 diameter. The bung tube may be attached to a frame interface 406 in multiple locations, e.g., 4 locations along bung tube 402 length, and the frame interface 406 is attached to the frame 404. The frame tube 204 is attached to the frame 404, for example via the mating mechanism 402 and in some embodiments frame trailing arm interface 406 (e.g., bung, rod end, hyme joint, tabs etc.). The wheel tube 202 is at least partially inset inside of the wheel 206 in a wheel hub space 410 and the wheel tube 202 has a cutaway section 420 to clear axle 408. The wheel tube 202 may have a first wheel tube tubular (e.g., circular) portion 416 and a wheel tube second portion 418 that is remaining from cutaway section 420 of the wheel tube 202. In some embodiments the wheel tube first portion 416 and the wheel tube second portion 418 may be made individually and assembled (e.g., welded) together. In some embodiments the second (proximal) tubular portion 418 is in front of the wheel axis 414. In some embodiments the proximal tubular portion 418 has less than 180 degrees (or alternatively has less than half the circumference (or perimeter) of the wheel tube distal portion 416) of material left from wheel tube distal portion 416 when viewed axially. In some embodiments, wheel tube 202 has a proximal portion 418 circumference or perimeter that is less than wheel tube distal portion 416 circumference or perimeter (e.g., ⅛, ¼, ½ etc.) to provide clearance of axle 408. In some embodiments the axle 408 may enter wheel hub space 410 at different angles, requiring a need to adjust proximal portion circumference to provide axle clearance. In some embodiments the wheel tube 202 has a first circular portion 416 attached to a wheel hub 412 and surrounds the wheel axle 408. In some embodiments the wheel tube distal portion 416 has a wall thickness that defines an inner lumen 722 such that the wheel axle can be placed within the inner lumen of the wheel tube distal portion. In some embodiments the wheel tube proximal portion 418 extends along a majority of the wheel tube 202.

Figure 5:
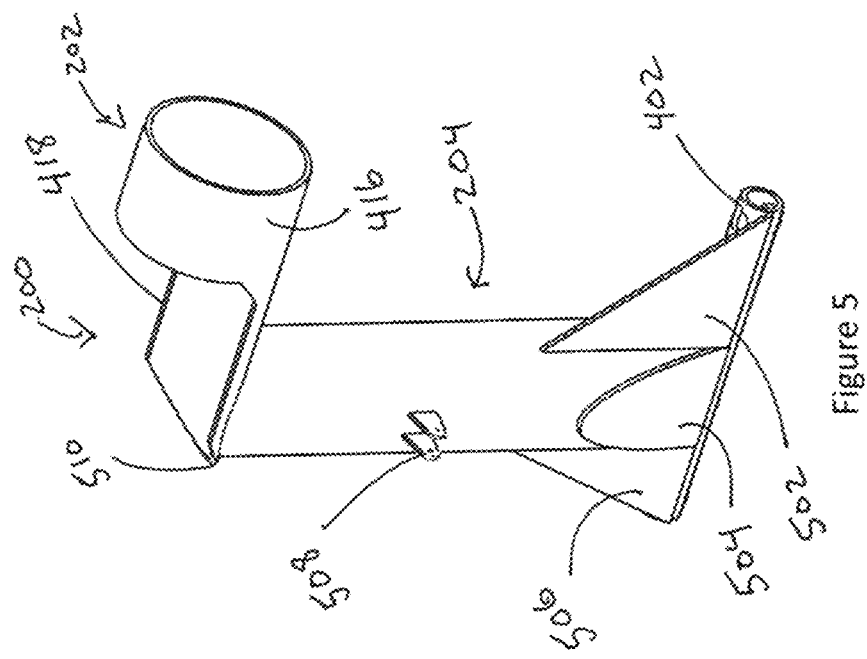
FIG. 5 is a view of a trailing arm in accordance with an embodiment.

FIG. 5 shows, by way of example, a trailing arm 200 in accordance with an embodiment. The trailing arm 200 may have a wheel tube 202 with a wheel tube first portion (e.g., distal) 416 that may be circular and a wheel tube second portion (e.g. proximal) 418 that may be tubular and is a remaining portion from a cutaway section of wheel tube first portion 416. Wheel tube 202 is attached, in some examples via welding, to a frame tube 204. The frame tube 204 may have a strut mount 508, and supporting brackets, 506, 504, 502, and a mating mechanism 402. The supporting brackets 502, 506 can extend wider than frame tube 204. The mating mechanism 402 may be a bung tube and the bung tube 402 may be wider than the frame tube 402 diameter. The bung tube may be attached to a frame interface 406 in multiple locations, e.g., 4 locations along bung tube 402 length, and the frame interface is attached to the frame 404. Attaching to the frame in this way can minimize scrub. The wheel tube first portion 416 can be cut to length to accommodate particular ATVs. In some embodiments, a trailing arm 200 can have a wheel tube 202 and a frame tube 204 with extra lengths distal of mated section (e.g., welded) 510. For example, wheel tube first portion 416 can have an axial length that is long enough to accommodate various ATVs and be cut to length. The frame tube 204 can have a distal end, i.e., away from welded section 510 that is cut to length. The extra lengths can provide a universal trailing arm build that can be easily customized to lengths for various different ATVs. This minimizes part numbers and saves manufacturing time and cost.

Figure 6:
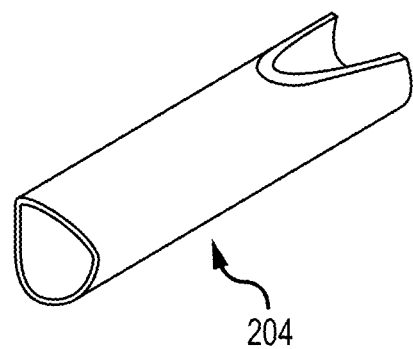
FIG. 6 is a view of a frame tube for a trailing arm in accordance with an embodiment.
Figure 6:
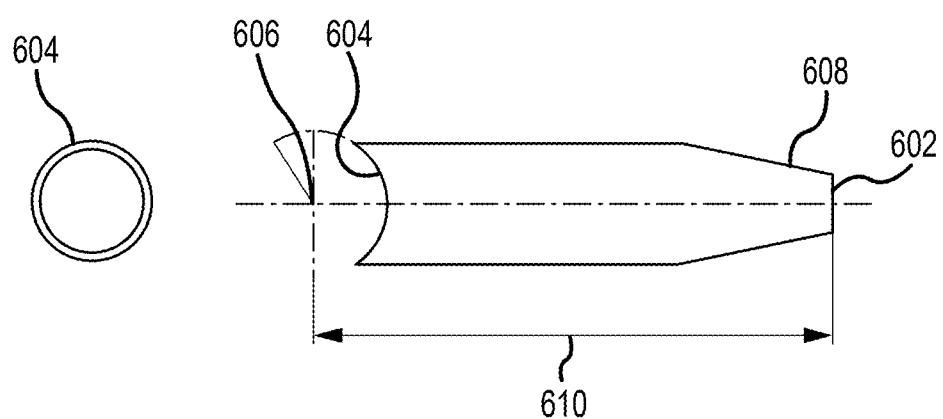

FIG. 6 shows, by way of example, a frame tube 204. The frame tube 204 may have a frame tube distal end 602. The frame tube distal end 602 can be attached to the frame 404 via a frame tube interface 406. The frame tube 204 has a proximal end 604 that mates with wheel tube 202. The frame tube proximal end 604 can be a cut section that has an arc or a radius to mate with wheel tube 202 (e.g., tubular) portion. The frame tube can have various dimensions, in one example, the frame tube 204 has a frame tube effective length 610 of approximately 26.5 inches from wheel tube center axis 606. In one example frame proximal end 604 has a radius of 3.88 inches. Frame tube 204 can have a frame tube proximal end 604 with a radius of approximately 3 inches and a wall thickness of 0.25 inches. Various dimensions can be used to accommodate specific needs of trailing arm 200. In some embodiments, frame tube 204 (e.g., tubular) has a frame tube distal end 602 that has a frame tapered portion 608. The frame tapered portion can have a length of approximately 8 inches. In one embodiment, frame tube 204 has a frame tube distal end 602 that has a diameter of approximately 3 inches.

Figure 7:
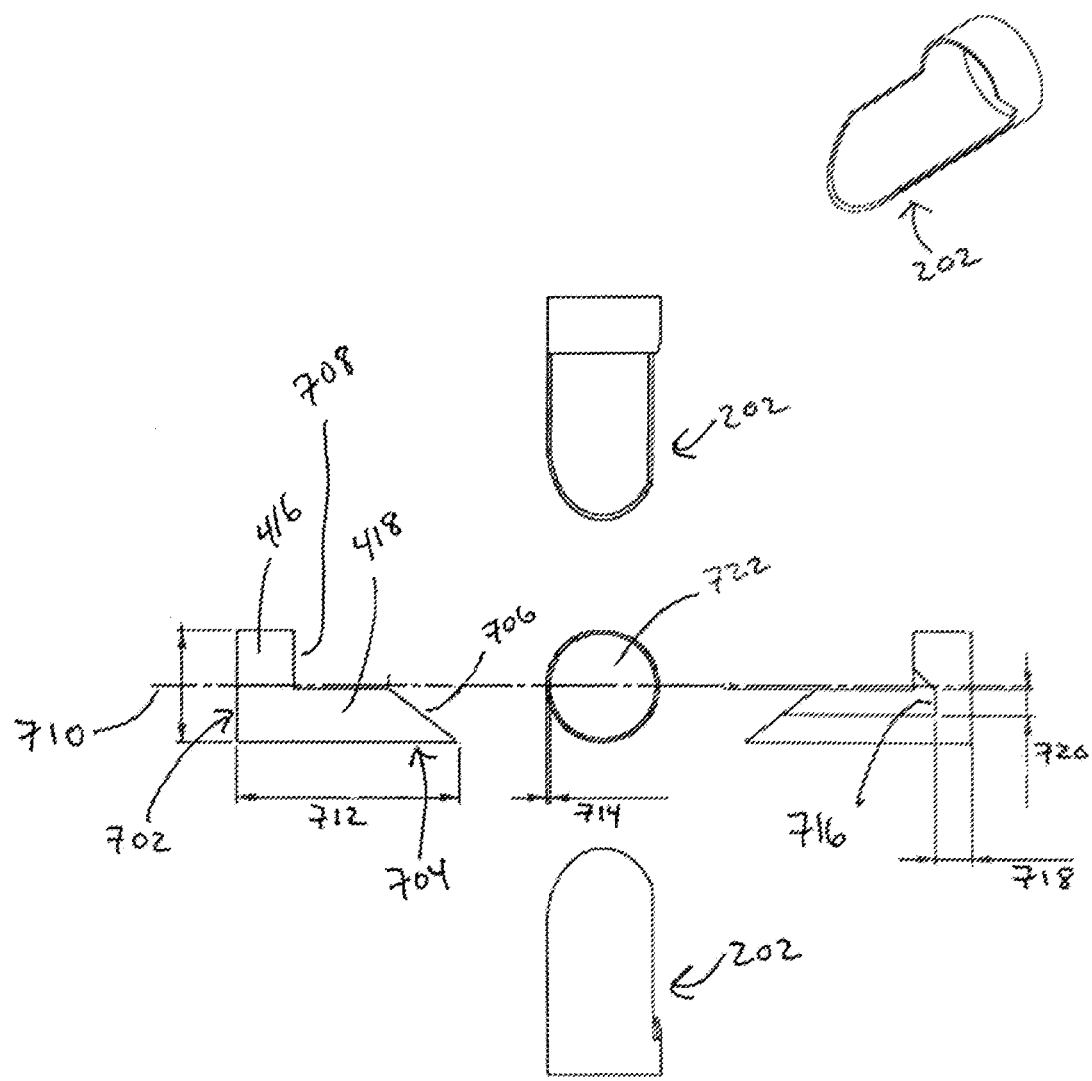
FIG. 7 is a view of a wheel tube for a trailing arm in accordance with an embodiment.

FIG. 7 shows, by way of example, a wheel tube 202. Wheel tube 202 has a wheel tube first proximal portion 704 that is an exterior surface (e.g., an exterior surface that faces frontward of ATV 100) of wheel tube distal portion 418 and the wheel tube first proximal portion 704 can mate with frame tube proximal end 604. Wheel tube 202 has a wheel tube distal portion 702 thatcan mate with wheel hub 412. Wheel tube 202 has a second proximal portion 706 that may be tapered for approximately 5 inches. In some embodiments second proximal portion 706 may not be tapered and may be a proximal end of the wheel tube 202 and could be mated to an exterior surface of frame tube 204 or frame tube distal end 604. Frame tube distal end 604 could be a square cut in some embodiments. Wheel tube 202 may have a wheel tube first (e.g., distal) portion 416 that is circular and has an axial length of approximately 4 inches. Wheel tube distal end 702 may have a diameter of approximately 8 inches. Wheel tube first portion 416 may have a wheel tube first portion proximal end 708 with a length of approximately 4.25 inches (or a length that extends past wheel tube centerline 710, for example 0.25 inches). Wheel tube distal end 702 may have a diameter of approximately 8 inches. Wheel tube 202 may have a wheel tube wall 714 thickness of 0.25 inches, or 0.375 inches, or tailored to ATV needs. Wheel tube 202 may have an wheel tube maximum length 712. In one example the wheel tube maximum length is approximately 15.8 inches, extending between wheel tube distal portion distal end 702 and wheel tube proximal portion proximal end 706. Wheel tube first portion proximal end 708 may have a wheel tube first portion proximal end that is recessed 716. Recessed portion 716 may extend a distance 718 approximately 2.5 inches from wheel tube distal end 702 and a distance 720 of 1.75 inches.

The frame can be constructed in various ways, for example, U.S. Pat. Nos. 9,493,191 and 10,023,234 are incorporated by reference, and describe how an ATV frame can be made and useful with trailing arms described herein.

It is to be understood that the above reference arrangement are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be practical and useful embodiment(s) of the invention, it will be apparent to those of ordinary skill in the art that numerous modifications can be made without departing from the principles and concepts of the invention as set forth herein.

What is claimed is:

1. A vehicle comprising:
   a frame;
   a first rear trailing arm;
   a rear wheel with a wheel hub space and a wheel hub, wherein the wheel hub is inset to the rear wheel inside of the wheel hub space, wherein the wheel hub has a wheel hub center axis and a wheel axle;
   wherein the first rear trailing arm has a frame tube portion having a frame tube portion proximal end and a frame tube portion distal end wherein the frame tube portion distal end is configured to be attached to at least a portion of the frame frontward of the wheel hub center axis;
   wherein the first rear trailing arm has a wheel tube portion angled from the frame tube portion and the wheel tube portion having a wheel tube proximal portion and a wheel tube distal portion, wherein the wheel tube proximal portion is frontward of the wheel hub center axis and wherein the wheel tube proximal portion is a remaining portion of the wheel tube distal portion that has been cutaway; and
   wherein the wheel tube distal portion is attached to the wheel hub and the wheel tube distal portion has a lumen that surrounds the wheel axle.

2. The vehicle of claim 1 wherein the frame tube proximal portion is attached to the wheel tube proximal portion exterior surface.

3. A method of manufacturing a trailing arm comprising:
   obtaining a tubular wheel portion for the trailing arm;
   obtaining a tubular frame portion for the trailing arm;
   removing a portion of the tubular wheel portion to define a tubular wheel distal portion and a tubular wheel proximal portion wherein the tubular wheel proximal portion is a remaining amount from the removed portion;
   and attaching the tubular wheel distal portion and tubular frame portion together.

4. The method of claim 3 further comprising cutting the tubular wheel portion to length and the tubular frame portion to length.

5. A trailing arm comprising:
   a frame tube portion having a frame tube portion proximal end and a frame tube portion distal end wherein the frame tube portion distal end is configured to be attached to at least a portion of a vehicle frame frontward of a wheel hub center axis of a wheel hub;
   wherein the trailing arm has a wheel tube portion angled from the frame tube portion and the wheel tube portion having a wheel tube proximal portion and a wheel tube distal portion, wherein the wheel tube proximal portion is frontward of the wheel hub center axis and wherein the wheel tube proximal portion is a remaining portion of the wheel tube distal portion that has been cutaway; and wherein the wheel tube distal portion is attached to the wheel hub and the wheel tube distal portion has a lumen that surrounds a wheel axle.

* * * * *